(12) United States Patent
Ino

(10) Patent No.: US 10,142,286 B2
(45) Date of Patent: Nov. 27, 2018

(54) SERVER DEVICE, CONTROL METHOD FOR THE SAME AND COMPUTER-READABLE RECORDING MEDIUM

(71) Applicant: GREE, INC., Tokyo (JP)

(72) Inventor: Yuki Ino, Tokyo (JP)

(73) Assignee: GREE, Inc., Tokyo (JP)

( * ) Notice: Subject to any disclaimer, the term of this patent is extended or adjusted under 35 U.S.C. 154(b) by 689 days.

(21) Appl. No.: 14/331,916

(22) Filed: Jul. 15, 2014

(65) Prior Publication Data
US 2015/0024833 A1 Jan. 22, 2015

(30) Foreign Application Priority Data

Jul. 16, 2013 (JP) .................................. 2013-148081
Oct. 30, 2013 (JP) .................................. 2013-225490
Dec. 27, 2013 (JP) .................................. 2013-272233

(51) Int. Cl.
*A63F 13/69* (2014.01)
*H04L 29/12* (2006.01)
(Continued)

(52) U.S. Cl.
CPC .............. *H04L 61/35* (2013.01); *A63F 13/69* (2014.09); *A63F 13/85* (2014.09);
(Continued)

(58) Field of Classification Search
CPC .......... A63F 13/70; A63F 13/73; A63F 13/77; A63F 13/79; A63F 2300/55; A63F 2300/5506; A63F 13/69; A63F 13/85; H04L 61/35; H04L 61/6004; G06Q 30/0207; G06Q 30/0224
(Continued)

(56) References Cited

U.S. PATENT DOCUMENTS 6,985,933 B1 1/2006 Singhal et al.
7,165,220 B1 1/2007 Bates et al.
(Continued)

FOREIGN PATENT DOCUMENTS

JP 2000-020536 A 1/2000
JP 2002-63090 A 2/2002
(Continued)

OTHER PUBLICATIONS

Office Action issued in related application JP2014-139887 with English translation, dated Oct. 14, 2014, 6 pages.
(Continued)

*Primary Examiner* — Allen Chan
(74) *Attorney, Agent, or Firm* — Maier & Maier, PLLC

(57) ABSTRACT

A program which is capable of offering a reward to a user who has registered a simple access means to a predetermined screen is disclosed.

The program causes a computer to function as reception means for receiving an access request from a terminal device used by a user; determination means for determining, based on a character string contained in a URL of an access destination of the received access request, whether or not a simple access means to the URL is registered in the terminal device; and offering means for offering a reward to the user who uses the terminal device that performs the access request when the simple access means is determined to be registered.

9 Claims, 7 Drawing Sheets

(51) Int. Cl.
*A63F 13/85* (2014.01)
*G06Q 30/02* (2012.01)

(52) U.S. Cl.
CPC ..... *G06Q 30/0207* (2013.01); *G06Q 30/0224* (2013.01); *H04L 61/6004* (2013.01)

(58) Field of Classification Search
USPC .......................................................... 463/25
See application file for complete search history.

(56) References Cited

U.S. PATENT DOCUMENTS

| | | | | |
|---|---|---|---|---|
| 2002/0116411 | A1* | 8/2002 | Peters | G06F 17/30884 715/234 |
| 2003/0154126 | A1* | 8/2003 | Gehlot | G06Q 30/02 705/14.53 |
| 2008/0010142 | A1* | 1/2008 | O'Brien. | G06F 17/30864 705/14.72 |
| 2010/0211448 | A1 | 8/2010 | Beenau et al. | |
| 2011/0060659 | A1 | 3/2011 | King et al. | |
| 2011/0312423 | A1 | 12/2011 | Mosites et al. | |
| 2012/0004967 | A1* | 1/2012 | Satyavolu | G06Q 30/0215 705/14.17 |
| 2012/0122554 | A1* | 5/2012 | Paquet | A63F 13/5375 463/25 |
| 2012/0136704 | A1 | 5/2012 | Carlson et al. | |
| 2012/0265604 | A1 | 10/2012 | Corner et al. | |
| 2013/0282753 | A1 | 10/2013 | Sugimoto | |
| 2014/0274363 | A1 | 9/2014 | Massing et al. | |

FOREIGN PATENT DOCUMENTS

| | | |
|---|---|---|
| JP | 2002-202931 A | 7/2002 |
| JP | 2006-048658 A | 2/2006 |
| JP | 2008-307262 A | 12/2008 |
| JP | 2012-085240 A | 4/2012 |
| JP | 2013-222412 A | 10/2013 |

OTHER PUBLICATIONS

Office Action issued in related application JP2014-139887 with English translation, dated Mar. 10, 2015, 6 pages.
Final Office Action issued in corresponding U.S. Appl. No. 15/364,837, dated May 23, 2017, 7 pages.
Office Action issued in corresponding U.S. Appl. No. 15/364,837, dated Nov. 16, 2017, 13 pages.
Office Action issued in corresponding U.S. Appl. No. 15/364,837, dated Sep. 7, 2017, 12 pages.
Advisory Action issued in corresponding U.S. Appl. No. 15/364,837, dated Jan. 30, 2018, 8 pages.

* cited by examiner

| USER ID | PASSWORD | REGISTERED GAME ID |
|---|---|---|
| UID001 | SSlom12 | GID02,GID19 |
| UID002 | V862S1v2 | GID11 |
| ... | ... | ... |
| UID036 | Op85sfee | GID99,GID85,GID01 |
| ... | ... | ... |
| UID150 | 86Simpl8 | GID03 |
| ... | ... | ... |

| USER ID | MEMBER REGISTRY DATE | NUMBER OF OFFERING REWARDS | NUMBER OF ACCESSES |
|---|---|---|---|
| UID001 | 2013/01/12 | 0 | 20 |
| UID002 | 2013/05/10 | 5 | 120 |
| ... | ... | ... | ... |
| UID036 | 2013/07/12 | 4 | 10 |
| ... | ... | ... | ... |
| UID150 | 2013/07/16 | 0 | 20 |
| ... | ... | ... | ... |

SERVER DEVICE, CONTROL METHOD FOR THE SAME AND COMPUTER-READABLE RECORDING MEDIUM

BACKGROUND

Disclosed herein are a server device, a control method for the same and a computer-readable recording medium.

There are a lot of known techniques for allowing a user to register a URL of user's favorite page during the visit to a web site. For example, JP2000-020536A discloses an internet terminal which generates a bookmark having search results that are classified according to search conditions of search through a search engine.

SUMMARY

However, in a conventional bookmark function such as the bookmark management device disclosed in JP2000-020536A, bookmark registration tends to depend on a user's personal interest or mood. Thus it is difficult for the WEB site to actively encourage the user to create a bookmark for such site. As an approach to user, for example, a web page provider arranges a button for adding a bookmark in an eye-catching position of the homepage in the hope that it will encourage the user to bookmark the web page. That is, the provider typically employs a kind of technique which allows the user to bookmark the page very easily. At first, when such a button was completely new and fresh to the user, the user used to push the button to add the bookmark. However, since this kind of method gets obsolete, setting the button is not enough to make a user to register the bookmark.

Embodiments of the invention are made in consideration of the situation as stated above, and aim to provide a program, a control method and a system for offering a reward to a user who has registered a simple access means to the predetermined screen in order to prompt the user to register the simple access means such as a bookmark or a shortcut.

An embodiment of the program causes a computer to function as reception means for receiving an access request from a terminal device used by a user; determination means for determining, based on a character string contained in a URL of an access destination of the received access request, whether or not a simple access means to the URL is registered in the terminal device; and offering means for offering a reward to the user who uses the terminal device that performs the access request when the simple access means is determined to be registered.

The "simple access means" comprises a function to access to a specific application or certain web contents from a home screen of the terminal device. For example, the simple access means include, but are not limited to a bookmark that registers a URL on the browser, an icon registered on the home screen and liking to a web clip of the predetermined URL or to a shortcut to the predetermined URL.

Moreover, the simple access means is preferred to be an icon linking to a shortcut to the URL.

Furthermore, the reward is preferred to be used in a game provided from the access destination.

Still furthermore, the offering means is preferred to offer the reward in response to the number of the simple access means registered in the terminal device.

Still furthermore, the simple access means is preferred to be added on the home screen of the terminal device.

An embodiment of a control method causes a computer to execute a step of receiving an access request from a terminal device used by a user; a step of determining, based on a character string contained in a URL of an access destination of the received access request, whether or not a simple access means to the URL is registered in the terminal device; and a step of offering a reward to the user who uses the terminal device that performs the access request when the simple access means is determined to be registered.

In addition, an embodiment provides a system with a reception unit that receives an access request from a terminal device used by a user; a determination unit that determines, based on a character string contained in a URL of an access destination of the received access request, whether or not a simple access means to the URL is registered in the terminal device; and an offering unit that offers a reward to the user who uses the terminal device that performs the access request when the simple access means is determined to be registered.

The "system" comprises a system which is configured of an information processor and the like and provides specific functions to the user. For example, the system comprises, but not limited to, a server device, a cloud computing system, an application service provider (ASP), a client server model, etc.

The program according to embodiments of the invention may be installed or loaded into the computer by being downloading such program from various recording media such as optical discs, e.g., CD-ROM, magnetic discs or semiconductor memory, or via a communication network.

In the specification, "unit" refers to not only a physical architecture, but also implementation of functions that the architecture has with software. The single function may be implemented by more than two physical architectures, and also, more than two functions may be implemented by single physical architecture.

Embodiments of the invention are capable of offering the reward to the user who has added the predetermined screen to the bookmark, thereby prompting the user to register the bookmark.

BRIEF DESCRIPTION OF THE DRAWINGS

FIG. 3 is a diagram illustrating a user information table according to the first embodiment;

FIG. 4 is a diagram illustrating a game history information table according to the first embodiment;

DETAILED DESCRIPTION

One embodiment of the invention will be described in detail below. However, the particular embodiments are not provided to limit the invention disclosed herein but to illustrate it as examples. Various changes and modifications may be made without departing from basic scope of the invention disclosed herein. It will be apparent to those skilled in the art the all embodiment by means of equivalent replacement may be employed and shall fall within the protection scope of the invention disclosed herein. The position relationships such as top and bottom or left and right follow the indications in the figures unless otherwise provided. Dimensions, sizes and ratios shown in figures are not provided to limit the invention. It should be appreciated that in the foregoing description the actual embodiment implemented by the information processor for the game is illustrated for the purpose of aiding in the understanding but, as stated above, not limiting the invention.

Figure 1:
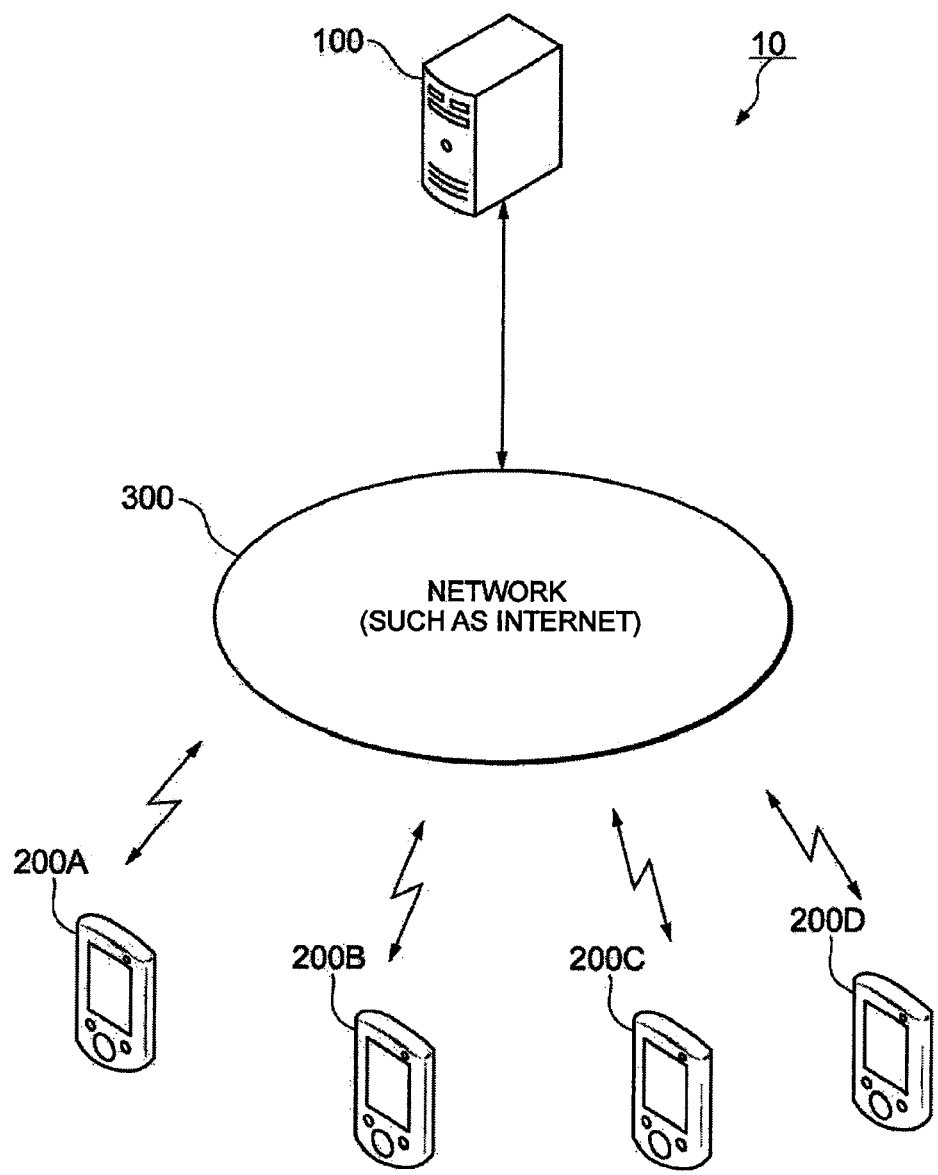
FIG. 1 is a configuration diagram illustrating a game system according to a first embodiment of the invention.

FIG. 1 is a system configuration diagram illustrating a game system 10 according to a first embodiment. As shown in FIG. 1, the game system 10 comprises a server device 100 and a mobile terminal 200. The server device 100 is a computer for the server, which is connected to a network 300, e.g., internet or exclusive line. The game system 10 is established by that the mobile terminal 200, which is a terminal device connected wirelessly or wired to the network 300 as with the server device 100, and the server device 100 are set to be communicable with each other. In this embodiment, the game system 10 is described as comprising the server device 100 and the mobile terminal 200, but the invention is not limited thereto. For example, the game system 10 may be configured to be a cloud computing system. In this case, the user uses a computer processing of the game system 10 via the network as a service. Moreover, the game system 10 may be configured to be a system comprising an ASP server.

The mobile terminal 200 is an information processor having a function to communicate with the server device 100 via the network 300. In particular, the mobile terminals include but are not limited to a mobile phone, a smartphone, a laptop, a PDA or a tablet PC. The mobile terminal 200, though not shown in FIG. 1, is provided with a control unit comprising CPU and a memory, a communication unit to access to the network 300, a input unit to receive operations from user, e.g., a touchscreen, a display unit to display cards and decks, and a recording unit to record an access tool to the predetermined URL.

The simple access means may be the bookmark added on the browser, the icon added on the home screen and liking to the shortcut, or the web clip, in order to access to the predetermined URL.

In this embodiment, the mobile terminal 200 is designated as a terminal which is used by the user to access the server device 100, but it is not limited to a portable terminal. The terminals accessible to the server device 100 are also available as the terminal which is used by the user to access the server device 100. For example, a non-portable terminal such as desktop PC may be employed.

The configuration of the game system 10 will be described below. The server device 100 provides various games including social network games to the user. The server device 100 offers the reward to the user who sends the access request when the simple access means to the URL accessible to the provided game is determined to be registered in the mobile terminal 200. The reward may be, for example, a game item, or a chance to draw a game item.

In this embodiment, the reward is offered to the user when the simple access means is determined to be registered in the user's terminal, but the invention is not limited thereto. For example, the reward may be offered provided that the user adds the icon linking to the shortcut on the home screen AND adds the bookmark to the favorite list of the web display application such as the browser. In this case, since the user can start the game more easily from lots of triggers, it can contribute to growth of social network game.

In this embodiment, the reward is offered to the user who has registered the simple access means only once, but the invention is not limited thereto. For example, with detecting daily active users (DAU) and monthly active users (MAU), the reward may be offered based on the number of login attempts. In particular, the reward may be offered to the user who has registered the simple access means to the top screen with less login attempts, but not to the user who has registered the simple access means to the top screen with many login attempts.

Moreover, in this embodiment, the every user who has registered the simple access means in the mobile terminal 200 gets the reward, but the invention is not limited thereto. For example, the reward may be offered only to the user who registers the simple access means within a week from certain announcement. Of course, the period may be a week or a month.

Figure 2:
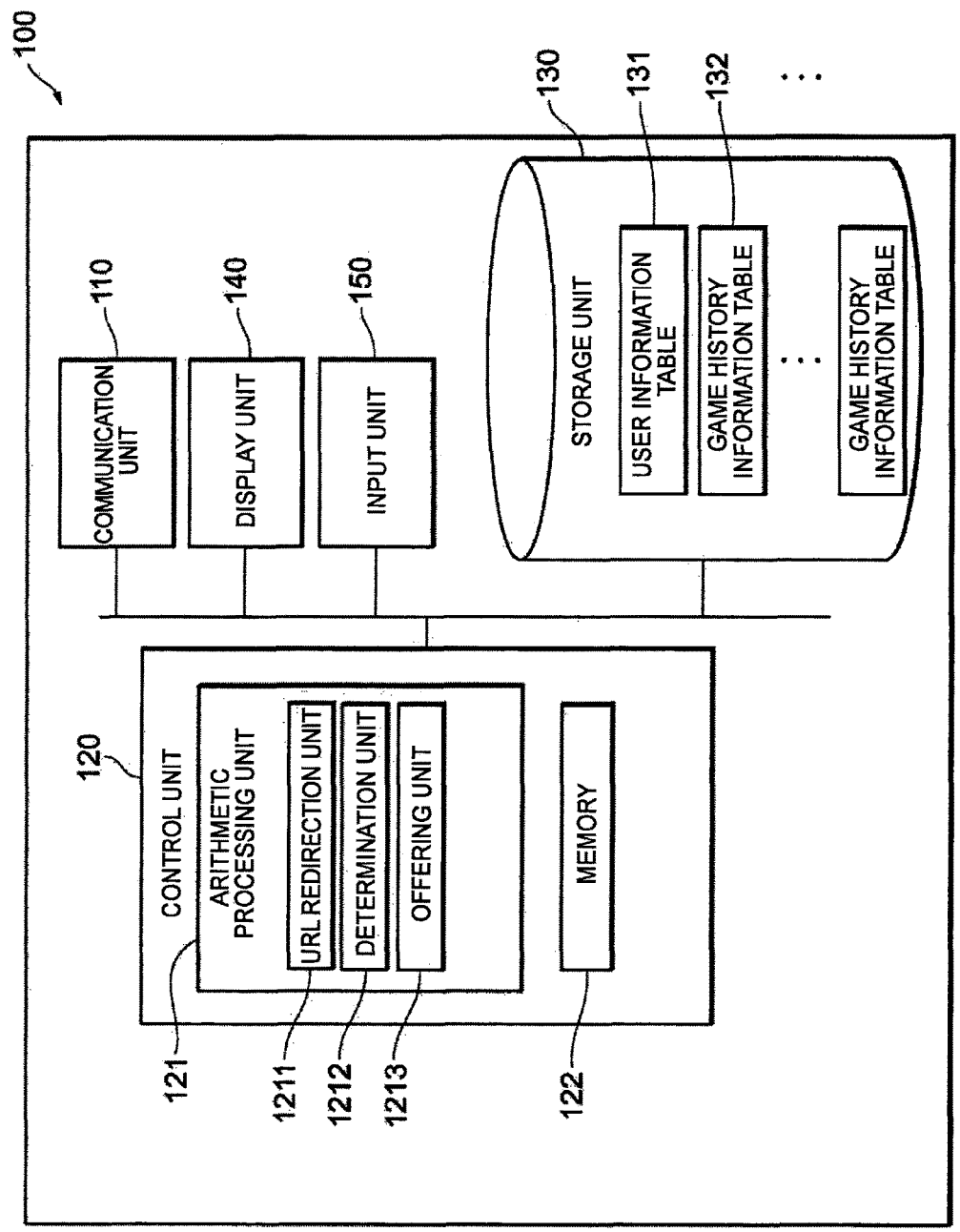
FIG. 2 is a block diagram illustrating a server device according to the first embodiment.

The configurations of server device 100 for implementation of the game system 10 as stated above will be described referring to FIG. 2. FIG. 2 is a block diagram of the server device 100. As shown in FIG. 2, the server device 100 is provided with a control unit 120, an input unit 150, a storage unit 130 and a communication unit 110.

The control unit 120 is provided with an arithmetic processing unit 121 such as a CPU or a MPU, a memory 122 such as RAM, and an image processing unit (not shown). The arithmetic processing unit 121 causes the various function units to be operated by executing a program stored in the storage unit 130. The program may be stored in the recording medium such as CD-ROM, or distributed via the network 300, to be installed into the computer. The memory 122 temporarily stores server program, game program, and various data sets required for computation during the running processes in such programs.

The input unit 150 is configured to receive the operations from the manager of the server device 100, and may be implemented by a keyboard, a mouse, or a touchscreen.

The storage unit 130 is configured by a storage device such as a hard disk, and stores various programs required for running processes in the control unit 120 or various data sets for running such various programs. In particular, the storage unit 130 is preferred to have a user information table 131 and a plurality of game history information tables 132.

FIG. 3 is a diagram illustrating the user information table 131, and FIG. 4 is a diagram illustrating the game history information table 132. The user information table 131 stores, as shown in FIG. 3, a user ID, a password, and a game ID of the game that the user has registered as a member, which are in a correlationship. The game history information table 132 stores for each game, as shown in FIG. 4, a user ID, member registry date, the number of offering rewards, and the number of accesses, of the user who has registered into the specific game as a member, which are in a correlationship.

Returning to FIG. 2, the configuration of the server device 100 will be described more.

The communication unit 110 is configured to connect the server device 100 to the network 300. For example, the communication unit 110 is implemented by a communication device such as a LAN card, an analog modem or an ISDN modem, and an interface which connects such devices to the processing unit via a transmission path such as a system bus.

As shown in FIG. 2, the arithmetic processing unit 121 is provided with a URL redirection unit 1211, a determination 1212 and an offering unit 1213, as function units.

The URL redirection unit 1211 redirects the URL linking to the simple access means. For example, the URL redirection unit 1211 redirects the URL of the screen to be displayed when the user has sent the access request to the predetermined screen (page) but still not acquired the reward. A pop-up prompting the user to register the simple access means in the home screen or on the browser is displayed. Therefore, it is able to determine that the user who sends the access request to the redirected URL has already registered the simple access means. Furthermore, the URL redirection unit 1211 is preferred to redirect to the different URLs, such as the URL to be registered on the home screen and the URL to be added on the browser.

The redirection may be carried out, for example, by adding an identifier such as "#bookmarked" to a tail end of the URL, or by adding the character string different for each user such as hashed value of the user ID. When the character string different for each user is added, the URL redirection unit 1211 stores the added string in the game history information table 132 of the corresponding user. When the user registers the simple access means in the mobile terminal 200, the user is capable of registering the URL different from the normal URL with the aid of the URL redirection performed by the URL redirection unit 1211.

The determination unit 1212 determines whether or not the user who has sent the access request is the user who has to be offered the reward. In particular, the determination unit 1212 determines whether or not the URL of the access destination includes the predetermined character string, thereby determining whether the URL of the access destination has been redirected to the URL for the registered simple access means. The determination unit 1212 may determine whether or not the user is a user who has been already offered the reward.

The offering unit 1213 offers the reward to the user of the mobile terminal 200, who has sent the access request from the simple access means. The offering unit 1213 may offer the reward depending on the number of simple access means registered in the mobile terminal 200. Moreover, the offering unit 1213 may offer the reward depending on a location on the mobile terminal 200, at which the user has registered the simple access means. In particular, for example, the mobile terminal 200 refers to a directory structure in the OS (i.e. storing position of the game icon) and sends such directory structure to the server device 100. The offering unit 1213 can detect a location at the simple access means has been registered on the basis of the sent directory structure. Alternatively, the registration location of the simple access means may be detected by notifying the offering unit 1213 of the server device 100 of the registration location when the simple access means is registered using the program to detect that the simple access means is registered.

Figure 5:
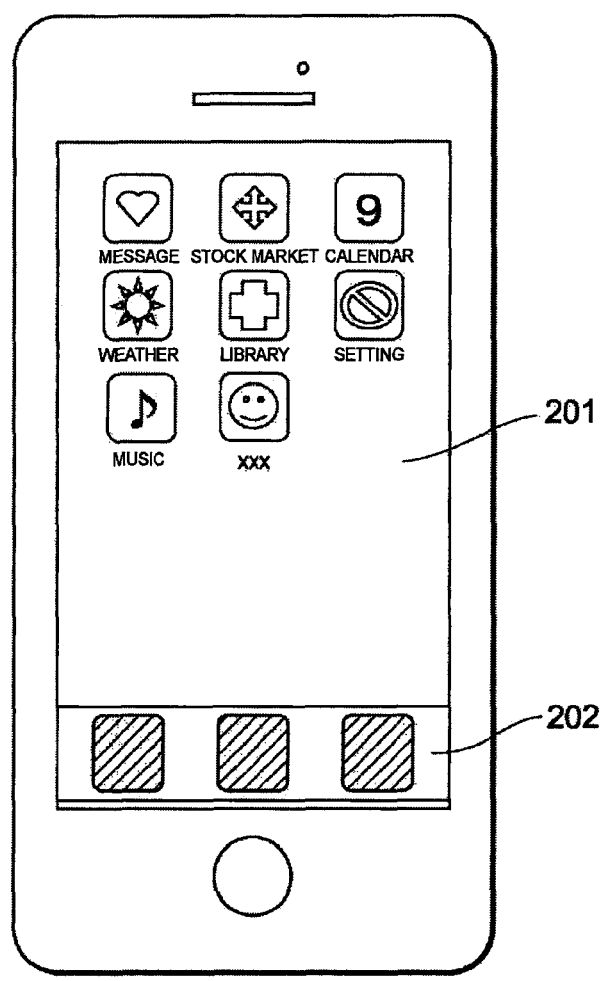
FIG. 5 is a diagram illustrating a home screen according to the first embodiment.

FIG. 5 is a schematic diagram illustrating the home screen of the mobile terminal. In this embodiment, the mobile terminal 200 comprises a plurality of scrollable screens 201, and a dock 202 which is fixed and displayed even after the screen is switched, on its home screen. The offering unit 1213 may offer the biggest reward to the user who has added the icon linking to the shortcut on the dock 202, and may offer the less reward to the user who has added the simple access means on the home screen 201 and the browser. Furthermore, when the home screen comprises a plurality of screens as shown in FIG. 5, a rich reward may be offered to the user who has added the icon on the specific screen.

The offering unit 1213 updates the number of offering rewards in the game history information table 132 after the reward is offered.

Figure 6:
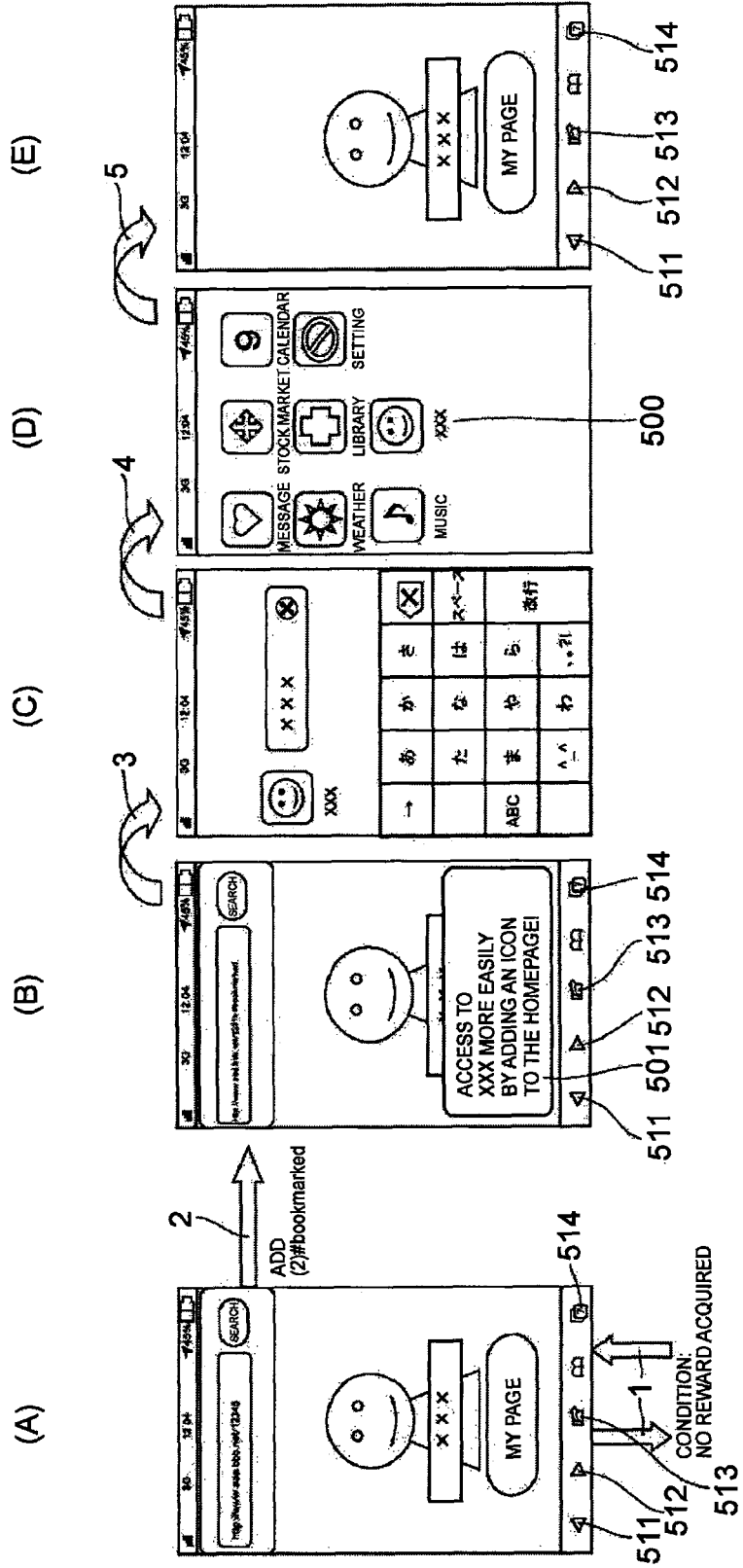
FIG. 6 is a schematic diagram illustrating an operation when the user registers a game screen provided from a server device as a bookmark according to the first embodiment.

FIG. 6 is a schematic diagram illustrating an operation when the user registers the icon linking to the shortcut to the predetermined URL, which links to the game screen provided from the server device 100, as the simple access means.

The user, who still has not added the icon, operates the mobile terminal 200 to run the browser (refer to FIG. 6(A)). When the browser runs on the mobile terminal 200, a footer which allows the user to perform touch operation is displayed, as shown in lower parts of FIGS. 6(A) and 6(B).

The footer has keys of Return 511, Forward 512, Add to Home Screen 513 and Switch 514.

The Return 511 is a key having a function to return to the previous browser screen. The Forward 512 is a key having a function to move toward one of browser screens opened previously. The Add to Home Screen 513 is a key having a function to register the icon which is associated with the currently open URL, icon image (e.g., thumbnail image) and a name of the simple access means (e.g., shortcut) in the mobile terminal 200. The Add to Home Screen 513 may register the bookmark on the list of the web page display application such as the browser, as a shortcut function. The Switch 514 is a key configured to switch between the open screens.

When the user sends the access request for a platform screen to the server device 100 from the browser, the arithmetic processing unit 121 of the server device 100 displays the platform screen which shows a list of the games on the mobile terminal 200. The user can select the favorite game from the platform screen. When the user selects the game, the screen displayed on the browser sends the access request for the top screen of the selected game from the platform screen. The URL, which is sent as the access request for the top screen, is "http://www.aaa.bbb.net/12345."

When the server device 100 receives the access request, the determination unit 1212 determines whether or not the user who has sent the access request is a user who has not acquired the reward in reference to the game history information table 132 related with the selected game to be accessed (arrow 1 of FIG. 6). When the determination 1212 determines that the user has been already acquired the reward since the number of offering rewards listed on the game history information table 132 is 1 or more, the arithmetic processing unit 121 displays the top screen on the mobile terminal 200 based on the accessed URL of "http://www.aaa.bbb.net/12345" (refer to FIG. 6(A)).

Meanwhile, when the determination unit 1212 determines that the user has no experience of acquiring a reward since the number of offering rewards listed on the game history information table 132 is 0, the determination unit 1212 further confirms the URL corresponding to the access request to determine whether or not it is the access attempt from the simple access means. In this example, specifically, the determination unit 1212 determines whether or not it is the access attempt from the simple access means depending on the predetermined character string ("#bookmarked" in this example) which is included in the URL. In this example, since the user accesses not using icon, there is no predetermined string "#bookmarked" in the URL. Therefore the determination unit 1212 determines that it is not the access via the icon, and the URL redirection unit 1211 redirects the URL of the top screen (arrow 2 of FIG. 6). For example, in FIG. 6, the string of "#bookmarked" is added to the normal URL of the top screen, i.e., "http://www.aaa.bbb.net/12345" to provide the URL of "http://www.aaa.bbb.net/12345#bookmarked". The top screen with the URL of "http://www.aaa.bbb.net/12345" and the top screen with the URL of "http://www.aaa.bbb.net/12345#bookmarked" preferably have the same contents though the URLs are different. The anchor of the character string "bookmarked", which is previously added to a head of the document describing the top screen, can allow the user to jump to the top screen via the URL with the "#bookmarked". Moreover, the arithmetic processing unit 121 displays the top screen subjected to URL redirection, and simultaneously displays a pop-up with a phrase of "Access to XXX more easily by adding an icon to the homepage" for the user (refer to FIG. 6(B)).

The pop-up announcement has a function the same as the Add to Home Screen 513. When the user taps the displayed pop-up, the screen is displayed, where the user can input the currently open URL ("http://www.aaa.bbb.net/12345#bookmarked"), the icon image and the name of the shortcut (refer to FIG. 6(C) and arrow 3). When the user decides the name of the shortcut, the currently open URL, the icon image and the name of the shortcut are associated with each other, thus the icon 500 is added on the home screen of the mobile terminal 200 (refer to FIG. 6(D) and arrow 4).

The process when the user accesses to the top screen using the icon 500 will be described below. When the user taps the icon 500 newly added to the home screen for accessing to the top screen, the URL associated with the linked shortcut opens and jumps to the top screen (refer to FIG. 6(E) and arrow 5).

Figure 7:
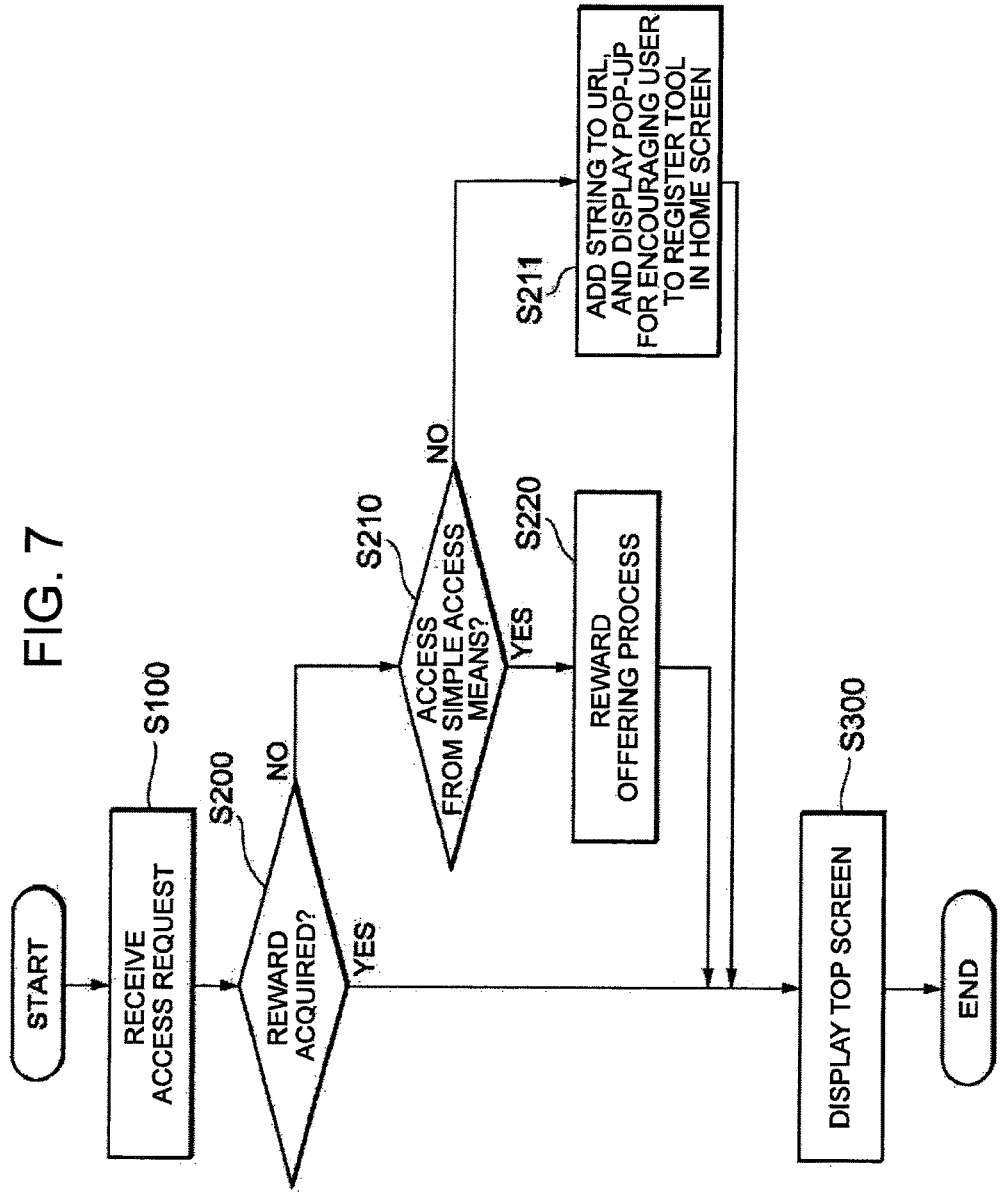
FIG. 7 is a flow chart illustrating a process flow of a server device according to the first embodiment.

The flow of additional process for the simple access means will be described referring to FIG. 7. The processing steps in the following flow of the process may be performed in different order or in parallel, and the new steps may be added between the existing steps within a range which does not conflict with the processing. Moreover, the single step may be divided into several steps and the several steps may be grouped as a single step since the number of steps is determined as a matter of convenience.

The user accesses the mobile terminal 200 to the server device 100 by operating the mobile terminal 200. When the mobile terminal 200 sends the access request for the platform screen, the control unit 120 displays the platform screen on the mobile terminal 200. The platform screen is preferred to be a screen which shows a list of the games provided from the server device 100.

When the user selects an arbitrary game from the game list displayed on the platform screen by operating the mobile terminal 200, the access request for the top screen is transmitted to the server device 100. In the top screen, when the user registers in the selected game as a member, user's record is created as the game history information table 132, and the member registry date is stored therein.

When the server device 100 receives the access request for the top screen (S100), the determination unit 1212 determines whether or not the user who has sent such an access request is a user who has not acquired the reward in reference to the game history information table 132 related with the game to be accessed (S200). The number of offering rewards listed in the game history information table 132 of the user is not 0, the determination unit 1212 determines that this user has been already acquired the reward (S200: YES). In this case, the arithmetic processing unit 121 performs no reward offering process, and transmits the top screen to the mobile terminal 200 for displaying (S300). However, the reward may be offered not depending on the reward has been offered or not, but depending on that the number of offering rewards being less than the predetermined number.

When the number of offering rewards listed on the game history information table 132 of the user who has sent the access request is 0, the determination unit 1212 further determines whether or not this access request is performed using the simple access means (S210). In particular, the determination unit 1212 determines whether the URL of the access destination is the URL redirected by the URL redirection unit 1211 for the registered simple access means (i.e., the URL with the identifier of "#bookmarked" at its tail end). When the determination unit 1212 determines that this access request has performed using the simple access means (S210: YES), the offering unit 1213 conducts the reward offering process (S220). The reward to be offered at this time may be decided based on a number of the games that the user has registered the simple access means. Alternatively, the reward may be offered based on the location at which the simple access means is registered (for example, the dock 202 on the home screen, the screen 201, browser, etc.). After completion of the reward offering process, the arithmetic processing unit 121 displays the top screen on the mobile terminal 200 (S300).

Meanwhile, the determination unit 1212 determines that the access request is not sent by simple access means (S210: NO), the arithmetic processing unit 121 carries out a process for prompting the user to register the simple access means. In particular, the arithmetic processing unit 121 displays the pop-up 501 as shown in FIG. 6(b) on the mobile terminal 200. This pop-up may explain what kind of the reward will be offered to the user who registers the simple access means in the mobile terminal 200. In this case, the URL redirection unit 1211 redirects to the URL for shortcut registry, which is made by adding the identifier of "#bookmarked" to the tail end of the URL of the top screen (S211). After displaying the pop-up, the arithmetic processing unit 121 displays the top screen on the mobile terminal 200 (S300). The reward offering process in S220 may be performed not only when the mobile terminal 200 sends the access request using the simple access means (in the example of FIG. 6, when the mobile terminal 200 accesses via the added icon after completion of the operations of steps (A) through (E) to add the icon), but also when, for example, the URL is redirected in S211 (in the example of FIG. 6, when the operations of steps (B) through (D) are performed during the initial access thereby adding the icon on the home screen).

As stated above, the determination unit 1212 is able to determine whether or not the user tries to access using the icon registered in the mobile terminal 200 in reference to the predetermined character string such as "#bookmarked" which may be added to the accessed URL. Moreover, the offering unit 1213 is able to offer the reward to the user who has accessed using the predetermined icon to motivate the user to register the simple access means.

The preferred embodiment of the invention disclosed herein has been described; however, the invention is not limited to this particular embodiment. Various changes and modifications may be made based on the technical idea of the invention.

For example, in the aforementioned embodiment, the mobile terminal 200 is configured to directly access to the server device 100 via the network 300. However, for example, when the communication system has the web server, the web server may relay the communication with the mobile terminal 200. It is possible to reduce the security risks by employing this configuration.

In the aforementioned embodiment, the game system 10 provides the games. However, the invention is not limited thereto. The system may provide, for example, electronic books or various applications.

The URL redirection 1211 may change the character string added to the URL depending on the access date. With this configuration, the tracking is easily carried out for the time point, for example, with largest user access attempts. In the aforementioned embodiment, the character string of "#bookmarked" is added to the URL. However, the invention is not limited thereto. Other character strings may be available. Furthermore, when the URL is redirected, the redirection is not limited to adding the predetermined string, but may be replacing with the completely different URL.

In the aforementioned embodiment, the URL redirection unit 1211 adds the character string of "#bookmarked" to the URL, and set the anchor (such as the character string of "#bookmarked") at head of the document describing the top screen. By setting the anchor, the same top screen appears via the URL with the character string of the "#bookmarked". However, the invention is not limited thereto. For example, the top screen may appear via the URL with the character string of the "#bookmarked" even if the specific anchor is not set in the document describing the top screen.

In the aforementioned embodiment, the URL redirection unit 1211 redirects the URL when the user who has accessed to the top screen is determined as the user who has not acquired any reward, or according to the period after the registration. However, the invention is not limited thereto. The URL redirection condition can be set arbitrarily. Moreover, the URL redirection unit 1211 may redirect the URL when the user accesses to the predetermined URL regardless whether or not the user has not acquired the reward, and may transmit the redirected URL to the user's terminal device.

In the aforementioned embodiment, the determination unit 1212 is configured to determine as a reward offering condition whether or not the access request is performed using the simple access means, or alternatively whether or not the number of offering rewards is less than the predetermined number. However, the determination unit 1212 is not limited thereto. For example, the determination unit 1212 may determine whether or not the user has accessed previously to the redirected URL for the registered simple access means in reference to the access log of the server device 100. When the access log contains no access history for this user, it is highly likely that the user has acquired the URL for the registered simple access means from, for example, a bulletin board of other sites. Therefore, the reward is not offered by the reward offering process to the user having no access history in the access log. Meanwhile, it is highly likely that the user, who accesses to the URL-redirected top screen and has the access history in the access log, has registered the simple access means in the normal top screen. Thus the reward is offered by the reward offering process.

Furthermore, the determination unit 1212 is also able to determine the number of times or frequency that the user, who sends the access request using the simple access means, has accessed to the page. In particular, the determination unit 1212 may determine whether or not the user has accessed to the top screen via the simple access means at least N times. Alternatively, the determination unit 1212 may determine whether or not the user accessed for N days in a row. In these determinations, the determination unit 1212 can refer to the number of accesses, or date of access to the top screen from the game history information table 132.

DESCRIPTION OF REFERENCE NUMERALS

10: game system
100: server device
110: communication unit
120: control unit
121: arithmetic processing unit
1211: URL redirection unit
1212: determination unit
1213: offering unit
130: storage unit
131: user information table
132: game history information table
140: display unit
150: input unit
200: mobile terminal
300: network

What is claimed is:

1. A method for controlling a server device that provides a game, in which a user can participate, and that is communicatively connected, via a communication network, to a terminal device operated by the user, the method comprising:
   the server device receiving an access request that specifies a URL, via the communication network, from the terminal device operated by the user;
   the server device carrying out a process for prompting the user to register a shortcut to a second URL when the URL specified by the access request is a first URL, the process for prompting the user including displaying an indication of a reward to be offered to the user for registering the shortcut to the second URL; and
   the server device offering a reward to the user without carrying out a process for prompting the user to register the shortcut when the URL specified by the access request is the second URL,
   wherein the shortcut is an icon linking to a shortcut to the URL;
   wherein the second URL provides access to the game; and
   wherein the reward is a reward usable in the game.

2. The method according to claim 1, wherein the reward is associated with a game provided from an access destination of the received access request.

3. The method according to claim 1, wherein the server device offers the reward in response to the number of the shortcut registered in the terminal device.

4. The method according to claim 1, wherein the second URL is a URL which adds a predetermined character string to the first URL and has the same contents as the first URL.

5. A tangible, non-transitory computer-readable medium or media storing machine-readable instructions that, when executed by one or more processors that provide a game, in which a user can participate, cause the one or more processors to:
   receive an access request that specifies a URL from a terminal device operated by the user;
   carry out a process for prompting the user to register a shortcut to a second URL when the URL specified by the access request is a first URL, the process for prompting the user including displaying an indication of a reward to be offered to the user for registering the shortcut to the second URL; and
   offer a reward to the user without carrying out a process for prompting the user to register the shortcut when the URL specified by the access request is the second URL,
   wherein the shortcut is an icon linking to a shortcut to the URL;
   wherein the second URL provides access to the game; and
   wherein the reward is a reward usable in the game.

6. A server device communicatively connected, via a communication network, to a terminal device operated by a user to provide a game in which the user can participate, the server device configured to perform operations comprising:
- receiving an access request that specifies a URL, via the communication network, from the terminal device operated by the user;
- carrying out a process for prompting the user to register a shortcut to a second URL when the URL specified by the access request is a first URL, the process for prompting the user including displaying an indication of a reward to be offered to the user for registering the shortcut to the second URL; and
- offering a reward to the user without carrying out a process for prompting the user to register the shortcut when the URL specified by the access request is the second URL, wherein the shortcut is an icon linking to a shortcut to the URL;
- wherein the second URL provides access to the game; and
- wherein the reward is a reward usable in the game.

7. A system comprising:
- a terminal device operated by a user; and
- a server device in communication with the terminal device via a communication network, to provide a game to the terminal device,
- wherein the terminal device is operable to perform operations comprising:
  - sending an access request that specifies a URL, to the server device, via the communication network;
  - carrying out a process for prompting the user to register a shortcut to a second URL when the URL specified by the access request is a first URL, the process for prompting the user including displaying an indication of a reward to be offered to the user for registering the shortcut to the second URL; and
  - offering a reward to the user without carrying out a process for prompting the user to register the shortcut when the URL specified by the access request is the second URL,
  - wherein the shortcut is an icon linking to a shortcut to the URL;
  - wherein the second URL provides access to the game; and
  - wherein the reward is a reward usable in the game.

8. A method executed in a terminal device communicatively connected, via a communication network, to a server device, the terminal device operated by a user and accessible to the server device to provide a game in which the user can participate, the method comprising:
- sending, by the terminal device, via the communication network, an access request that specifies a URL, to the server device;
- carrying out, by the terminal device, a process for prompting the user to register a shortcut to a second URL when the URL specified by the access request is a first URL, the process for prompting the user including displaying an indication of a reward to be offered to the user for registering the shortcut to the second URL; and
- the terminal device offering a reward to the user without carrying out a process for prompting the user to register the shortcut when the URL specified by the access request is the second URL,
- wherein the shortcut is an icon linking to a shortcut to the URL;
- wherein the second URL provides access to the game; and
- wherein the reward is a reward usable in the game.

9. A system, comprising:
- a terminal device operated by a user; and
- a server device in communication with the terminal device via a communication network, to provide a game to the terminal device, the server device configured to perform operations comprising:
  - receiving an access request that specifies a URL, via the communication network, from the terminal device operated by the user;
  - carrying out a process for prompting the user to register a shortcut to a second URL when the URL specified by the access request is a first URL, the process for prompting the user including displaying an indication of a reward to be offered to the user for registering the shortcut to the second URL; and
  - offering a reward to the user without carrying out a process for prompting the user to register the shortcut when the URL specified by the access request is the second URL,
  - wherein the shortcut is an icon linking to a shortcut to the URL;
  - wherein the second URL provides access to the game; and
  - wherein the reward is a reward usable in the game.

* * * * *